(12) United States Patent
Catron et al.

(10) Patent No.: US 11,662,986 B1
(45) Date of Patent: May 30, 2023

(54) REDUCING DATA TRANSFER TO MACHINE LEARNING ACCELERATOR HARDWARE

(71) Applicant: Meta Platforms, Inc., Menlo Park, CA (US)

(72) Inventors: Garret Ray Catron, Sunnyvale, CA (US); Jordan Samuel Fix, San Francisco, CA (US); Bertrand Allen Maher, Newark, CA (US); Nicholas Gibson, Menlo Park, CA (US); Nadathur Rajagopalan Satish, San Jose, CA (US); Roman Dzhabarov, Redwood City, CA (US); Hector Yuen, Palo Alto, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 481 days.

(21) Appl. No.: 16/825,282

(22) Filed: Mar. 20, 2020

(51) Int. Cl.
*G06F 8/41* (2018.01)
*G06T 1/20* (2006.01)

(52) U.S. Cl.
CPC . *G06F 8/41* (2013.01); *G06T 1/20* (2013.01)

(58) Field of Classification Search
CPC .................................. G06F 8/41; G06T 1/20
See application file for complete search history.

(56) References Cited

U.S. PATENT DOCUMENTS

| | | | |
|---|---|---|---|
| 2004/0012600 A1* | 1/2004 | Deering | G06T 5/002 345/506 |
| 2011/0145447 A1* | 6/2011 | Dimond | G06F 13/28 710/23 |
| 2018/0373664 A1* | 12/2018 | Vijayrao | G06F 13/4068 |
| 2019/0370631 A1* | 12/2019 | Fais | G06F 8/31 |
| 2020/0004596 A1* | 1/2020 | Sengupta | G06N 5/04 |
| 2020/0326959 A1* | 10/2020 | Moeller | G06F 9/541 |
| 2020/0349109 A1* | 11/2020 | Natanzon | G06F 11/1451 |
| 2021/0133577 A1* | 5/2021 | Srinivasan | G06N 3/063 |

* cited by examiner

*Primary Examiner* — Jorge A Chu Joy-Davila
(74) *Attorney, Agent, or Firm* — Van Pelt, Yi & James LLP (57) ABSTRACT

A computer program compiled for a machine learning accelerator hardware and associated with a default input data size is received. An execution of an operation of the computer program is initiated. It is identified that a data size of an input data of the operation is smaller than the default input data size. The smaller data size of the input data of the operation rather than the default input data size is caused to be transferred to the machine learning accelerator hardware for the input data of the operation.

20 Claims, 6 Drawing Sheets

REDUCING DATA TRANSFER TO MACHINE LEARNING ACCELERATOR HARDWARE

BACKGROUND OF THE INVENTION

Machine learning accelerators, also known as artificial intelligence accelerators, are a class of specialized hardware accelerators or computer systems designed to accelerate artificial intelligence applications. Machine learning accelerators are able to run artificial intelligence applications more efficiently (e.g., faster and/or consuming less power) than general-purpose computing hardware, such as central processing units. Machine learning accelerators can be utilized for various artificial intelligence applications, including image classification, object detection, semantic segmentation, speaker diarization, speech recognition, translation, sentiment analysis, recommendation, gameplay, and other applications. Machine learning accelerators are typically not as flexible as general-purpose computers. This can lead to inefficiencies when a machine learning application that is being run on a machine learning accelerator requires flexibility. Thus, it would be beneficial to develop techniques to increase the flexibility of machine learning accelerators while also preserving the performance benefits of machine learning accelerators.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Reducing data transfer to machine learning accelerator hardware is disclosed. A computer program compiled for a machine learning accelerator hardware and associated with a default input data size is received. An execution of an operation of the computer program is initiated. It is identified that a data size of an input data of the operation is smaller than the default input data size. The smaller data size of the input data of the operation rather than the default input data size is caused to be transferred to the machine learning accelerator hardware for the input data of the operation. A practical and technological benefit of the techniques disclosed herein is a reduction of the amount of data that needs to be transferred to machine learning accelerator hardware, which conserves data transfer bandwidth and increases machine learning accelerator hardware efficiency.

Machine learning accelerators (also referred to herein as machine learning accelerator hardware, artificial intelligence (AI) accelerators, AI accelerator hardware, etc.) are specialized hardware accelerators or computer systems designed to accelerate artificial intelligence applications. Machine learning accelerators are able to run artificial intelligence applications more efficiently (e.g., faster and/or consuming less power) than general-purpose computing hardware, such as central processing units (CPUs). Applications of machine learning accelerators include image classification, object detection, semantic segmentation, speaker diarization, speech recognition, translation, sentiment analysis, recommendation (also known as personalized recommendation), gameplay, and other artificial intelligence applications. Machine learning accelerators can be utilized to accelerate operation of artificial neural networks as well as other artificial intelligence models. Machine learning accelerators often employ designs with many computing cores. Machine learning accelerators may also use low-precision arithmetic (e.g., half-precision and bfloat16 floating-point formats) to accelerate calculations and increase computational throughput. Specialized dataflow architectures and in-memory computing may also be utilized to provide additional acceleration.

Machine learning accelerators are typically not as flexible as general-purpose processors, such as CPUs. Many machine learning accelerators require input data sizes to be known at compile time and static once loaded. For example, many machine learning accelerators require shapes of tensors to be known at compile time and static once loaded. As used herein, a tensor refers to a data object analogous to but more general than a vector, wherein the tensor is represented by an array of components that are functions of the coordinates of a space. Examples of tensors include scalars (no indices), vectors (one index), matrices (two indices), as well as higher-dimensional objects that have an arbitrary number of indices. An example four-dimensional tensor may have indices corresponding to batch size, height, width, and depth. The shape of this tensor is determined by the sizes of the dimensions corresponding to batch size, height, width, and depth. Furthermore, in this example, the maximum input data size would be a tensor shape with dimensions that are the maximum sizes for batch size, height, width, and depth. Requiring input data sizes to be known at compile time often means a default maximum input data size is utilized to accommodate various possible input data sizes that may be encountered even if input data sizes are rarely as large as the default maximum input data size. This results in transferring unnecessary information to the machine learning accelerator hardware. As described in further detail herein, in various embodiments, input data sizes smaller than the default maximum data size (e.g., tensor shapes with dimension sizes smaller than the maximum tensor dimensions) are identified at runtime and used to transfer only the necessary data to the machine learning accelerator hardware. In various embodiments, the techniques disclosed herein are applied to accelerate performance of machine learning accelerators operating in inference mode.

Figure 1:
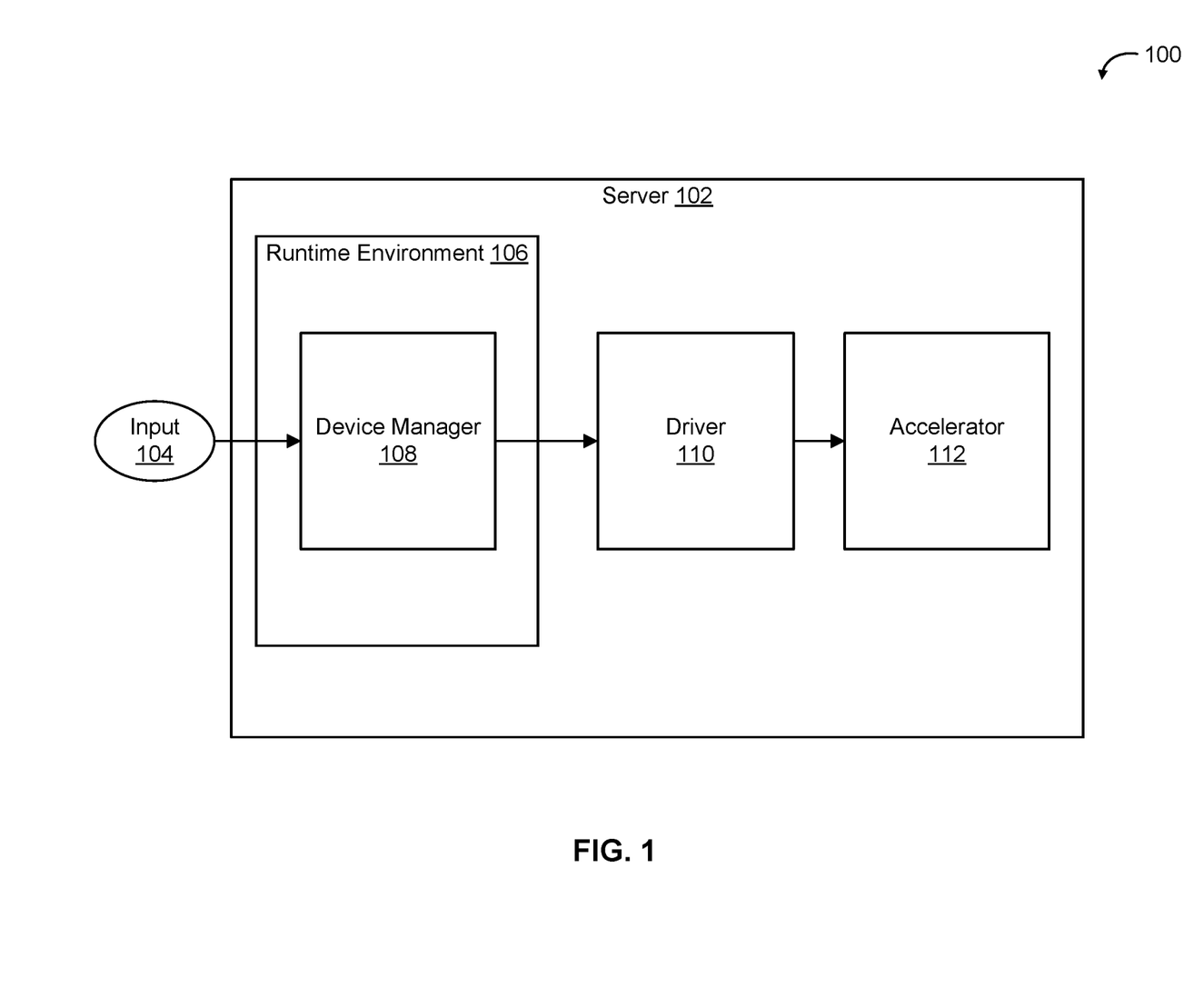
FIG. 1 is a block diagram illustrating an embodiment of a system for accelerating machine learning applications.

FIG. 1 is a block diagram illustrating an embodiment of a system for accelerating machine learning applications. In the example shown, system 100 includes server 102. In various embodiments, server 102 is a computer or other hardware component that receives requests to perform machine learning/artificial intelligence related computations. In some embodiments, the requests are transmitted over a network and received by server 102. In some embodiments, server 102 receives data associated with machine learning/artificial intelligence related computations via a network. Examples of a network include one or more of the following: a direct or indirect physical communication connection, mobile communication network, Internet, intranet, Local Area Network, Wide Area Network, Storage Area Network, and any other form of connecting two or more systems, components, or storage devices together. In various embodiments, server 102 receives requests to perform machine learning operations. Server 102 may receive a computer program compiled for a machine learning accelerator, receive input data associated with the compiled computer program, initiate an execution of an operation of the computer program, and return a result of the execution of the operation.

In the example illustrated, server 102 receives input 104. In various embodiments, input 104 is an input data of an operation of a computer program that is being run on server 102. In various embodiments, the computer program is compiled for machine learning accelerator hardware. In various embodiments, there is a default input data size for the operation for which input 104 is an input. The default input data size may be substantially larger than typical data sizes of input 104 in order to accommodate various possible data sizes of input 104. Default input data sizes may be utilized due to inflexibility of machine learning accelerator hardware with respect to input data sizes for computer programs compiled for machine learning hardware. For example, a default input data size can correspond to a data size for which a specific machine learning accelerator program is compiled, wherein without the techniques disclosed herein a different data size can only be utilized by the machine learning accelerator if the program is recompiled. In typical scenarios, machine learning accelerators are not configured to handle dynamic shape (data) sizes. Stated alternatively, oftentimes, shape (data) sizes, including sizes of input, output, and intermediate data must be statically known by the machine learning accelerators (e.g., due to the machine learning accelerators needing to allocate memory resources before runtime). Oftentimes, configuring the machine learning accelerators to accept different data sizes requires using the different data sizes to recompile the programs running on the machine learning accelerators.

As described in further detail herein, techniques disclosed herein are directed toward identifying that a data size of input 104 is smaller than a default input data size for input 104 and causing the smaller data size of input 104 rather than the default input data size to be transferred to machine learning accelerator hardware. In some embodiments, input 104 includes a tensor data object. The tensor can store various types of data. For example, for image recognition applications, the tensor may include image data (e.g., two-dimensional or three-dimensional images). The image data may also include color dimensions (e.g., red, green, and blue channels). The tensor may include multiple images in which the images are organized along a batch size dimension. As another example, for recommendation applications, the tensor may include datasets to be searched (e.g., embedding tables). In some embodiments, the tensor data object is a container that includes a pointer to a raw data buffer storing data (e.g., image data, embedding table data, etc.) and also includes metadata associated with the data stored in the raw data buffer. In various embodiments, size information is part of the metadata. For example, a field for data size of input 104 and/or a field for the default input data size associated with input 104 can be included as metadata in the tensor data object. As described in further detail herein, size information metadata can be utilized to reduce data transfer to machine learning accelerator hardware.

In the example illustrated, input 104 is received by runtime environment 106 of server 102. In various embodiments, runtime environment 106 is a software environment in which a computer program compiled for machine learning accelerator hardware and having input 104 as an input is supported with access to software libraries, systems variables, environment variables, and other services and processes involved in the execution of computer program. In various embodiments, runtime environment 106 is the software environment in which the computer program is in a runtime state in which it can send instructions to accelerator hardware, access memory, and perform other runtime functions. In some embodiments, device manager 108 is a software component within runtime environment 106 that handles transfer of input 104 to a specified machine learning accelerator (e.g., accelerator 112). For example, in some embodiments, device manager 108 sets up direct memory access (DMA) transfers to send raw data (e.g., images, embedding tables, etc.) to accelerator 112. DMA transfers can be utilized to transfer data across a peripheral component interconnect (PCI) bus, such as PCI express (PCIe). In various embodiments, device manager 108 is responsible for copying data (e.g., tensor data) to accelerator 112, initiating execution on accelerator 112, and retrieving results from accelerator 112.

Figure 2:
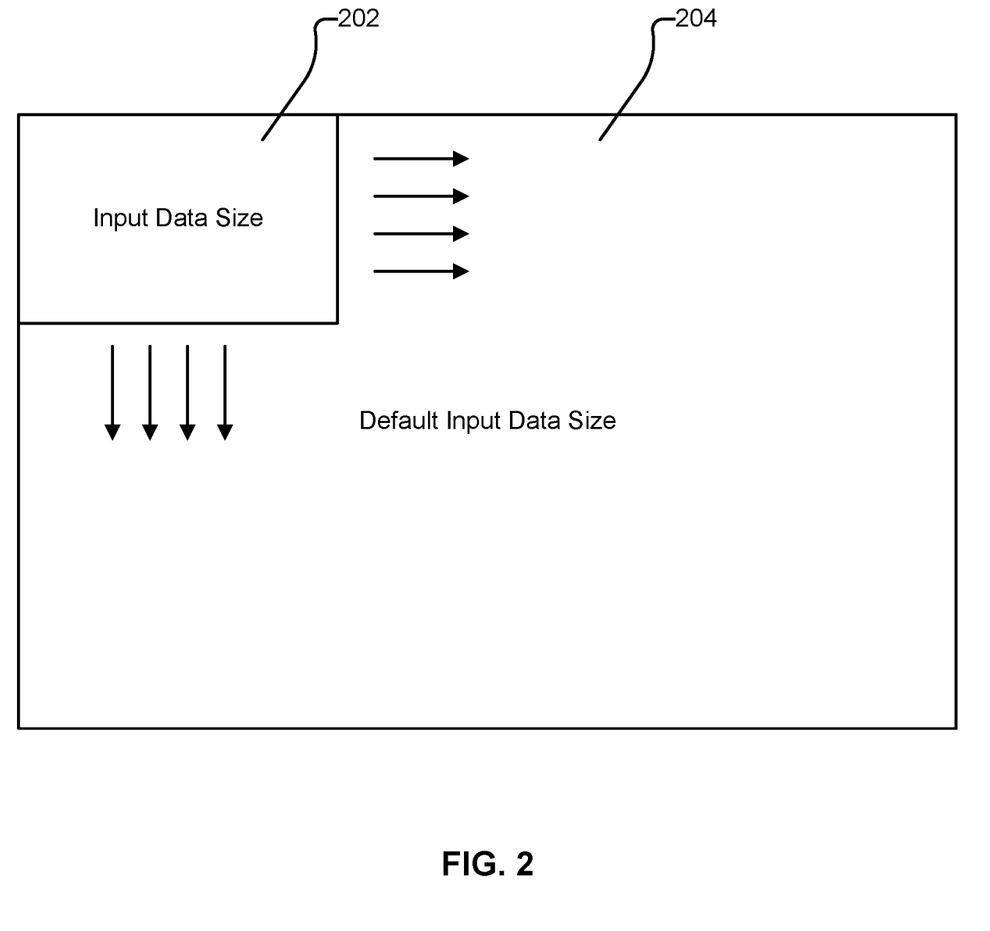
FIG. 2 is a diagram illustrating an example of how unpadded and padded input data sizes are related.

In some embodiments, device manager environment 108 examines computer program data (e.g., input 104). For example, input 104 can include a tensor data object that includes a data size (also referred to herein as an unpadded or actual data size) field as well as a default size (also referred to herein as a padded or maximum data size) field, and device manager 108 can examine the data size field and the default size field. In various embodiments, if device manager 108 determines that the unpadded size is smaller than the padded size (e.g., measured in bytes), then device manager 108 transfers data in the amount of the unpadded size to the machine learning accelerator hardware (e.g., accelerator 112) instead of data in the amount of the padded (maximum) size. In some embodiments, device manager 108 accomplishes this by setting up a DMA transfer using the unpadded size instead of the padded size as a DMA transfer parameter. This results in only the necessary data being copied (e.g., over PCIe) to accelerator 112. An example of the relationship between unpadded size and padded size is illustrated in FIG. 2. In FIG. 2, input data size 202 corresponds to an unpadded data size that is less than or equal in size to default input data size 204, which corresponds to a padded data size.

In some embodiments, each accelerator receives data via a one-to-one relationship from a device manager (e.g., accelerator 112 is linked one-to-one to device manager 108). In the example illustrated, server 102 includes a single device manager and accelerator combination. It is also possible for server 102 of have a plurality of accelerators, in which case there would be a matching plurality number of device managers. In various embodiments, a shared kernel mode driver interfaces with the one or more device managers in order for each device manager to communicate with its respective accelerator. Stated alternatively, in various embodiments, a plurality of device managers to one driver to a plurality of accelerators relationship exists.

In the example illustrated, device manager 108 is communicatively connected to driver 110. In various embodiments, driver 110 is a shared kernel mode driver that can interface with multiple device managers (in systems with multiple device mangers and accelerators). In various embodiments, device manager 108 is the calling program that invokes driver 110 to issue commands to accelerator 112. In various embodiments, driver 110 is the interface between device manager 108 and accelerator 112. Stated alternatively, driver 110 functions as an interface between software and hardware components. In some embodiments, driver 110 includes software that allows for communication with accelerator 112 via a computer bus or other communications subsystem to which accelerator 112 is connected. Driver 110 generates transfer commands in a format that accelerator 112 accepts in response to data transfer instructions provided by device manager 108. For example, in some embodiments, when device manager 108 provides DMA transfer instructions, driver 110 generates PCIe compatible transfer commands based on the DMA transfer instructions. Commands in other formats are also possible. The specific types of transfer commands generated by driver 110 depends on the communications architecture associated with accelerator 112. In various embodiments, when accelerator 112 sends data back to driver 110, driver 110 invokes routines in device manager 108 to accept the data from accelerator 112.

In the example illustrated, driver 110 is communicatively connected to accelerator 112. Accelerator 112 is a machine learning accelerator hardware unit (also referred to as an AI accelerator hardware unit). In various embodiments, accelerator 112 is configured to operate in inference mode, e.g., utilize a trained machine learning model to perform image classification, object detection, semantic segmentation, speaker diarization, speech recognition, translation, sentiment analysis, recommendation, or another function on received data. In various embodiments, accelerator 112 includes a plurality of computing cores. In some embodiments, accelerator 112 is configured to utilize low-precision arithmetic (e.g., half-precision and bfloat16 floating-point formats) and other architectural adaptations not included in general-purpose processors such as CPUs in order to increase computational throughput and/or reduce power consumption associated with machine learning inference computations. Various architectures may be used to implement accelerator 112. For example, accelerator 112 may include one or more graphics processing units (GPUs), application-specific integrated circuits (ASICs), or field-programmable gate arrays (FPGAs). In various embodiments, accelerator 112 leverages a parallel computing architecture (e.g., at a matrix operation level) to increase computing throughput.

In the example shown, portions of the communication path between the components are shown. Other communication paths may exist, and the example of FIG. 1 has been simplified to illustrate the example clearly. Although single instances of components have been shown to simplify the diagram, additional instances of any of the components shown in FIG. 1 may exist. For example, server 102 may include multiple sets of device managers and accelerators. The number of components and the connections shown in FIG. 1 are merely illustrative. Components not shown in FIG. 1 may also exist. For example, memory (e.g., random-access memory (RAM)) is also connected to accelerator 112 (and a bus or other communications subsystem linking the memory and accelerator 112 is also included) so that data in memory can be transferred to accelerator 112.

FIG. 2 is a diagram illustrating an example of how unpadded and padded input data sizes are related. In some embodiments, input data size 202 corresponds to the size (e.g., in bytes) of useful data in input 104 of FIG. 1 and default input data size 204 corresponds to a padded data size that accelerator 112 of FIG. 1 is configured to accept. In the example illustrated, input data size 202 can be less than or equal in size to default input data size 204.

Figure 3:
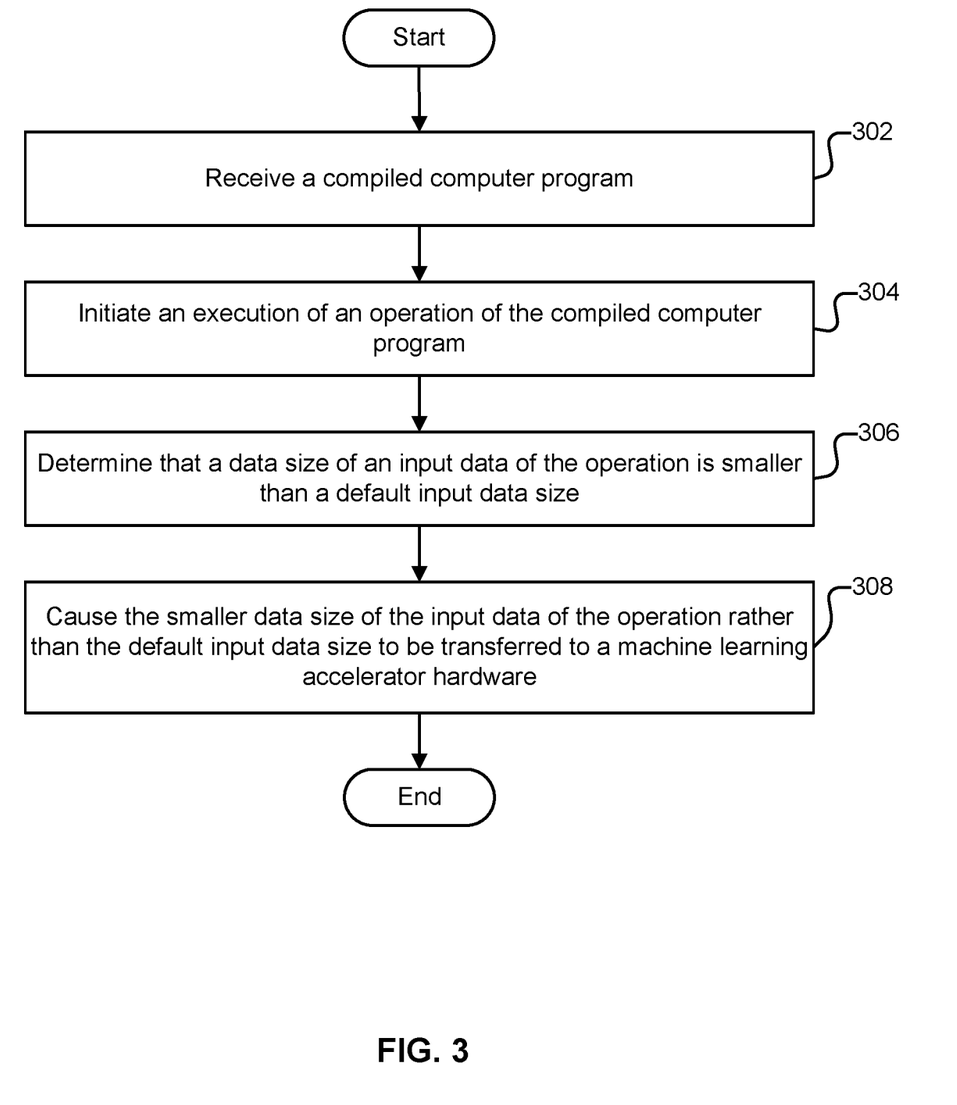
FIG. 3 is a flow chart illustrating an embodiment of a process for reducing data transfer to a machine learning accelerator.

FIG. 3 is a flow chart illustrating an embodiment of a process for reducing data transfer to a machine learning accelerator. In some embodiments, the process of FIG. 3 is performed by server 102 of FIG. 1.

At 302, a compiled computer program is received. In some embodiments, the compiled computer program is received by server 102 of FIG. 1. In various embodiments, the computer program is compiled for a machine learning accelerator hardware and associated with a default input data size. In some embodiments, an input associated with the default input data size is input 104 of FIG. 1. In various embodiments, the computer program is a machine learning program compiled for a specific architecture (e.g., ASIC, GPU, etc.) designed to run the machine learning program. In some embodiments, the computer program is compiled for accelerator 112 of FIG. 1. In various embodiments, the machine learning accelerator hardware is configured to only accept the default input data size regardless of the actual input data size.

At 304, an execution of an operation of the compiled computer program is initiated. In some embodiments, the execution is initiated within runtime environment 106 of FIG. 1 where the compiled computer program exists in a runtime state. In various embodiments, the operation that is executed and the program that is run are based at least in part on the machine learning model that the machine learning accelerator hardware implements. For example, for machine learning models and machine learning accelerator hardware configured for image recognition, a convolution operation may be executed. An example of an image recognition machine learning model is ResNet-50, which is a convolutional neural network that has been trained on millions of images for image classification purposes.

As another example, for machine learning models and machine learning accelerator hardware configured for recommendation, an embedding operation may be executed. As used herein, an embedding operation refers to a sparse lookup operation into a large embedding table combined with a pooling operation (e.g., element-wise reduction operation). Embedding operations are fundamental to many personalized recommendation systems that utilize machine learning. Examples of embedding operations include SparseLengthsSum (SLS) and its variants. Embedding operations typically exhibit gather-reduce patterns in which the specific pooling operation can vary. SLS includes a sparse lookup into a large embedding table followed by a summation of looked up elements. SparseLengthsWeightedSum, a variant of SLS, performs a gather-reduce embedding operation with weighted summation.

At 306, it is determined that a data size of an input data of the operation is smaller than a default input data size. In some embodiments, device manager 108 of FIG. 1 compares the data size of the input data and the default input data size. In some embodiments, the input data is included in input 104 of FIG. 1. The input data may include a tensor of data. For example, the tensor may include a series of images, wherein the tensor dimensions include image height, image width, image depth, image color channel, image number, etc. As another example, the tensor may include an embedding table with a specified number of dimensions. In various embodiments, the tensor is part of tensor data object, which can also be described as a metadata object or container. Within the tensor data object, a pointer to raw tensor data (e.g., image data, embedding table data, etc.) stored in a data buffer may be used.

In various embodiments, the input data (e.g., a tensor data object) includes a default size field that specifies the default size of the tensor (a maximum padded size) and a data size field that specifies the data size of the tensor (an unpadded actual size of the tensor). In some embodiments, these fields are examined in runtime environment 106 of FIG. 1. Data sizes may be specified in bytes. In some embodiments, data sizes are identified using placeholder bindings. Stated alternatively, symbols can be mapped to tensors. For a given placeholder binding for a tensor, the tensor can be annotated with data size information. In this manner, data size, as well as other metadata can be stored so that a machine learning computer program does not need to be recompiled each time data size or other metadata is changed. This is beneficial if the same tensors are used multiple times (e.g., across multiple requests to the machine learning accelerator hardware). In addition, after every request, metadata can be updated. As an alternative to including size information within the input data (e.g., within a tensor metadata object), it is also possible to store size information in a separate data structure (e.g., a separate table). In some embodiments, device manger 108 of FIG. 1 compares the actual data size of the tensor and its default size to determine whether the actual data size is smaller. Upon a determination that the actual data size of the tensor is smaller than its default size, device manager 108 may initiate a transfer of only the actual data of the tensor.

At 308, the smaller data size of the input data of the operation rather than the default input data size is caused to be transferred to a machine learning accelerator hardware. In some embodiments, device manager 108 initiates transfer of the smaller data size of the input. This may include setting up a DMA transfer to send raw data of the input data (e.g., images, embedding tables, etc.) to machine learning accelerator hardware (e.g., accelerator 112 of FIG. 1). Further conversion of instructions generated by device manger 108 may occur. In some embodiments, a device driver (e.g., driver 110 of FIG. 1) converts instructions from device manager 108 into a format that can be utilized to transfer data across a specified bus or communications subsystem (e.g., a PCIe bus) to which the machine learning accelerator hardware is connected and then issues commands in that format to transfer the input data to the machine learning accelerator hardware.

A benefit of the technique described above is that the computer program that is run on the machine learning accelerator hardware can be compiled using the default input data size regardless of the actual data size of the input data. By utilizing an additional data field that can be examined during runtime (e.g., using placeholder bindings to map data size fields to tensors), the actual data size of the input data can be determined during runtime even though it cannot be determined at compile time. A benefit is that data transfer bandwidth (e.g., PCI bandwidth) is conserved. Because the computer program that is run on the machine learning accelerator hardware is still compiled using the default input data size, in some scenarios, compute resources of the machine learning accelerator hardware may not be conserved. For example, for convolution operations, a convolution compute on a data block of the default input data size may still occur. In other scenarios, compute resources as well as data transfer bandwidth can be conserved. For example, for SLS-type operations, compute resources are conserved because these operations have the ability to determine when the end of the data on which the operations operate has been reached (e.g., due to the dimensions of the data being parameters of the operations). Thus, whether compute resources, in addition to data transfer bandwidth, are conserved is based at least in part on the operation (e.g., convolution, SLS or variant, etc.). Therefore, the techniques disclosed herein are particularly beneficial for personalized recommendation systems that utilize machine learning because such systems depend heavily on SLS-type operations for which both compute resources and data transfer bandwidth are conserved using the techniques disclosed herein. For personalized recommendation machine learning applications, data transfer reduction benefits are especially significant because typical input data sizes are usually at least an order of magnitude smaller than default input data sizes.

Figure 4:
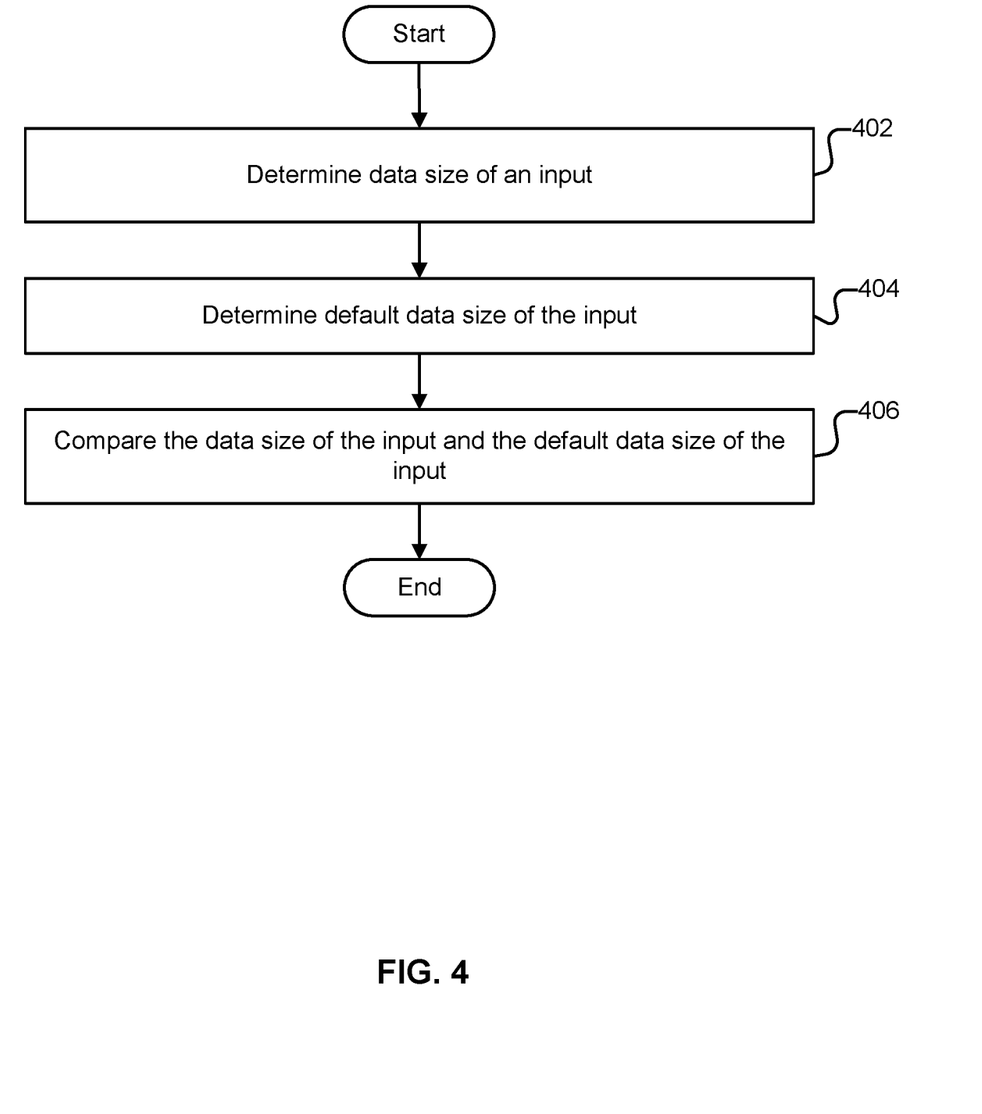
FIG. 4 is a flow chart illustrating an embodiment of a process for determining that a data size of an input is smaller than a default input data size.

FIG. 4 is a flow chart illustrating an embodiment of a process for determining that a data size of an input is smaller than a default input data size. In some embodiments, at least a portion of the process of FIG. 4 is performed in 306 of FIG. 3. In some embodiments, the process of FIG. 4 is performed by runtime environment 106 of FIG. 1.

At 402, a data size of an input is determined. In some embodiments, the input is input 104 of FIG. 1. In some embodiments, the input includes a tensor of data (e.g., a series of images in which each image can have an arbitrary number of dimensions, an embedding table with a specified number of dimensions, etc.) on which an operation is to be performed by machine learning accelerator hardware and must be transferred to the machine learning accelerator hardware. Within the input, a pointer to raw tensor data (e.g., image data, embedding table data, etc.) stored in a memory (e.g., a data buffer) may be utilized to pass the tensor to various system components and access the tensor. In various embodiments, the data size refers to the size (e.g., in bytes) of the raw tensor data stored in memory. In various embodiments, the input also includes metadata associated with the tensor and one of the pieces of metadata included in the input is the data size. In some embodiments, the data size is provided by a requestor of the operation. The requestor may be a computer program that sends a request to server 102 of FIG. 1 to perform a specified machine learning operation on an input provided by the requestor. In some embodiments, device manager 108 of runtime environment 106 of FIG. 1 determines the data size of the input (e.g., by examining a data size field among metadata associated with the input).

At 404, a default data size of the input is determined. In various embodiments, one of the pieces of metadata included in the input is the default data size of the input. In various embodiments, the default data size of the input refers to the maximum tensor size (e.g., in bytes) the machine learning accelerator hardware is configured to handle when performing the operation that the machine learning accelerator hardware is requested to perform. In some embodiments, device manager 108 of runtime environment 106 of FIG. 1 determines the default data size of the input. It is also possible to avoid actively determining the default data size if the machine learning accelerator hardware is already configured with the default data size as a default configuration setting. This can be the case if the default data size does not change across requests to the machine learning accelerator hardware.

In some embodiments, data sizes (e.g., the data size of the input, the default data size of the input, etc. that are received within runtime environment 106 of FIG. 1) are identified using placeholder bindings that create mappings of data size information to tensors. Utilizing a mapping approach, data size can be dynamic instead of needing to be known at compile time and static once loaded. Thus, shapes of tensors can be dynamic and would not need to be known at compile time and be static once loaded. This is beneficial if the same tensors are used multiple times (e.g., across multiple requests to the machine learning accelerator hardware). In addition, after every request, metadata can be updated.

At 406, the data size of the input and the default data size of the input are compared. In some embodiments, device manger 108 of runtime environment 106 of FIG. 1 compares the data size of the input and the default data size of the input. In various embodiments, it is determined whether the data size of the input is smaller than the default data size of the input. In various embodiments, the comparison is performed in software (e.g., in runtime environment 106, which is a software environment).

Figure 5:
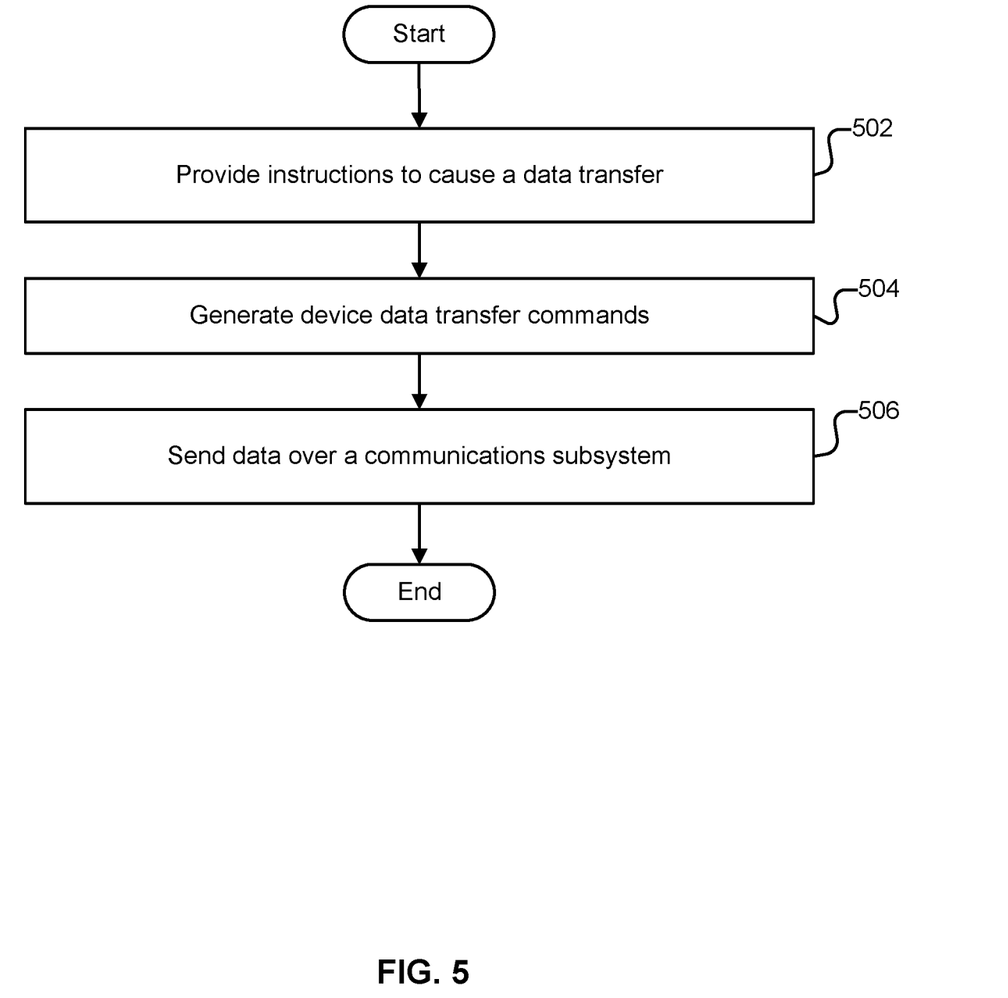
FIG. 5 is a flow chart illustrating an embodiment of a process for transferring data to machine learning accelerator hardware.

FIG. 5 is a flow chart illustrating an embodiment of a process for transferring data to machine learning accelerator hardware. In some embodiments, at least a portion of the process of FIG. 5 is performed in 308 of FIG. 3. In some embodiments, the process of FIG. 5 is performed by device manager 108 and driver 110 of FIG. 1.

At 502, instructions to cause a data transfer are provided. In various embodiments, the data to be transferred is data associated with an input (e.g., input 104 of FIG. 1) and the data to be transferred is smaller than a default/maximum amount of data associated with the input. In various embodiments, the data is to be transferred to machine learning accelerator hardware (e.g., accelerator 112 of FIG. 1). In some embodiments, device manager 108 of FIG. 1 provides instructions to cause the data transfer. In some embodiments, device manager 108 of FIG. 1 sets up a DMA transfer to send raw data of the input (e.g., images, embedding tables, etc.) to the machine learning accelerator hardware (e.g., accelerator 112 of FIG. 1).

At 504, device data transfer commands are generated. In some embodiments, driver 110 of FIG. 1 receives data transfer instructions provided by device manager 108 of FIG. 1 (e.g., DMA transfer instructions) and then converts the instructions into a format that can be utilized to transfer data across a specified bus or communications subsystem to which the machine learning accelerator hardware is connected. For example, driver 110 may translate DMA transfer instructions to PCIe data transfer commands.

At 506, data is sent over a communications subsystem. In various embodiments, the data that is sent has a size that is smaller than a maximum default size configured for the machine learning accelerator hardware receiving the data and performing the operation associated with the data. The machine learning accelerator hardware is communicatively connected to the communications subsystem. In various embodiments, memory (e.g., RAM) is also connected to the communications subsystem so that data in memory can be transferred to the machine learning accelerator hardware. In some embodiments, the communications subsystem includes a bus, e.g., a PCI bus such as PCIe. Transferring an amount of data that is less than the maximum default size conserves data transfer bandwidth (e.g., conserves PCI bandwidth).

Figure 6:
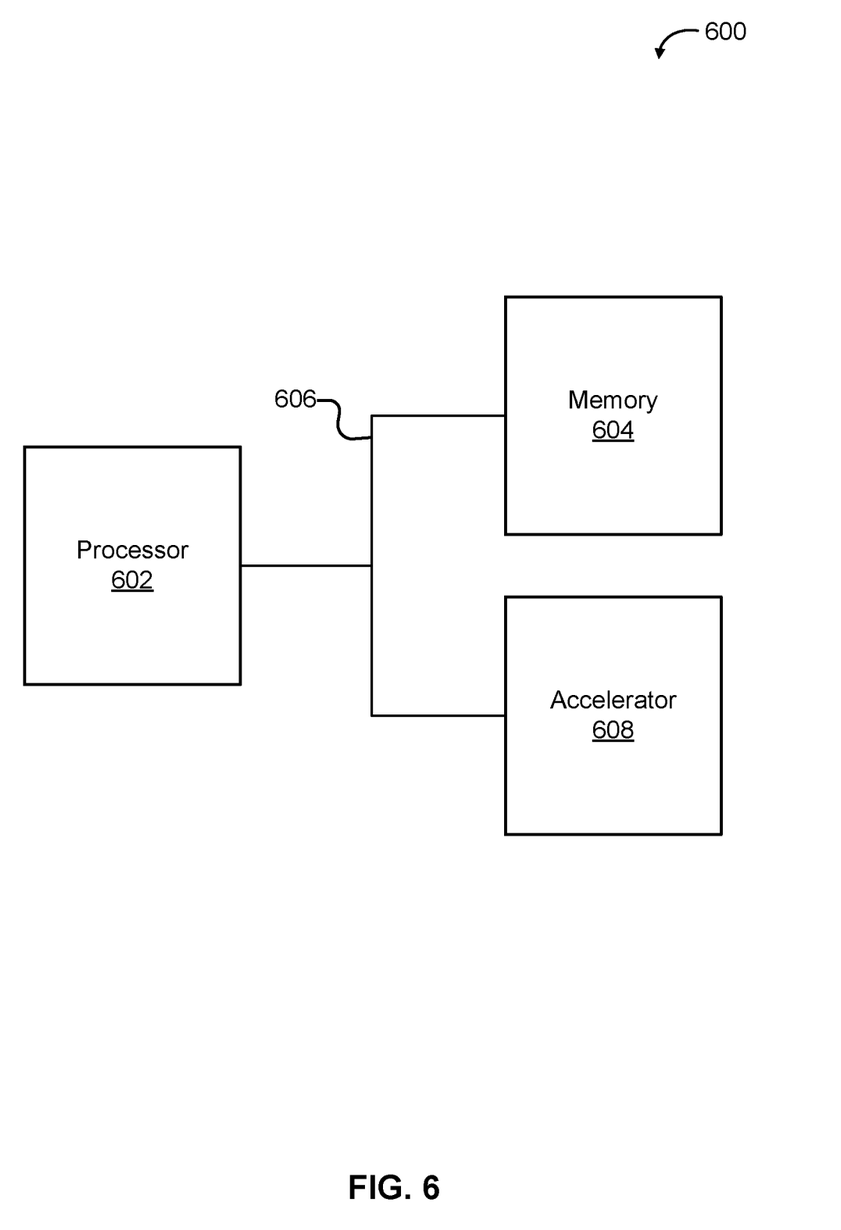
FIG. 6 is a block diagram illustrating an embodiment of a hardware system that includes a machine learning accelerator.

FIG. 6 is a block diagram illustrating an embodiment of a hardware system that includes a machine learning accelerator. In the example shown, system 600 includes processor 602, memory 604, bus 606, and accelerator 608. In some embodiments, accelerator 608 is accelerator 112 of FIG. 1. Various architectures may be used to implement accelerator 608. Accelerator 608 may include one or more GPUs, ASICs, FPGAs.

In some embodiments, processor 602 is configured to receive a computer program compiled for accelerator 608 and associated with a default input data size, initiate an execution of an operation of the computer program, identify that a data size of an input data of the operation is smaller than the default input data size and cause the smaller data size of the input data of the operation rather than the default input data size to be transferred to the machine learning accelerator hardware for the input data of the operation. In some embodiments, processor 602 executes a software runtime environment that receives the computer program. In some embodiments, processor 602 provides instructions to cause the input data to be transferred from memory 604 to accelerator 608 via bus 606. In the example shown, processor 602 and accelerator 608 are distinct units. It is also possible for processor 602 and accelerator 608 to be integrated into a single processing component. Processor 602 can be implemented by a single-chip processor or by multiple processors. In some embodiments, processor 602 is a general-purpose digital processor that controls the operation of system 600. Using instructions retrieved from memory 604, processor 602 can control the reception and manipulation of input data and the output and display of data. In some embodiments, processor 602 includes and/or is used to execute the functions and processes described respect to FIGS. 3-5.

Processor 602 and accelerator 608 are each coupled bi-directionally with memory 604, which can include a first primary storage, typically a RAM, and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602 and/or accelerator 608. Also, as is well known in the art, primary storage typically includes basic operating instructions, program code, data, and objects used by the processor 602 and/or accelerator 608 to perform their functions (e.g., programmed instructions). Examples of program code include both machine code, as produced, for example, by a compiler, or files containing higher level code (e.g., a script) that can be executed using an interpreter. Memory 604 can include any suitable computer-readable storage media depending on whether, for example, data access needs to be bi-directional or uni-directional. Processor 602 can also directly and very rapidly retrieve and store frequently needed data in a cache memory (not shown).

In addition to providing processor 602 and accelerator 608 access to storage subsystems, bus 606 can also be used to provide access to other subsystems and devices. These can include (not shown in the example illustrated) a display monitor, a network interface, a keyboard, and a pointing device, as well as an auxiliary input/output device interface, a sound card, speakers, and other subsystems as needed. In some embodiments, bus 606 is a PCI bus, such as PCIe.

The system shown in FIG. 6 is an example of a hardware system suitable for use with the various embodiments disclosed herein. Other hardware systems suitable for such use can include additional or fewer subsystems. In addition, bus 606 is illustrative of any interconnection scheme serving to link the subsystems. Other hardware architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a computer program compiled for a machine learning accelerator hardware and associated with a default input data size;
   initiating an execution of an operation of the computer program;
   receiving a data size of an input data of the operation;
   identifying that the data size of the input data of the operation is smaller than the default input data size; and
   causing the data size of the input data of the operation that is smaller than the default input data size to be transferred to the machine learning accelerator hardware for the input data of the operation, including by:
   utilizing a device manager component configured to manage the machine learning accelerator hardware and provide a direct memory transfer instruction using the data size of the input data of the operation that is smaller than the default input data size;
   receiving the direct memory transfer instruction using a driver component that is configured to be an interface between the device manager component and the machine learning accelerator hardware; and
   utilizing the driver component to generate a peripheral component interconnect bus compatible transfer command to transfer the data size of the input data of the operation based on the received direct memory transfer instruction.

2. The method of claim 1, wherein the machine learning accelerator hardware includes one or more of the following components: an application-specific integrated circuit, a graphics processing unit, or a field-programmable gate array.

3. The method of claim 1, wherein the operation is a convolution operation.

4. The method of claim 1, wherein the operation is a personalized recommendation system operation.

5. The method of claim 1, wherein the operation is part of a machine learning inference operation.

6. The method of claim 1, wherein the data size of the input data is a size of a tensor of raw data.

7. The method of claim 6, wherein the tensor of raw data includes image data or embedding table data.

8. The method of claim 6, wherein the tensor includes data organized along one or more dimensions corresponding to one or more of the following properties: batch size, height, width, or depth.

9. The method of claim 1, further comprising receiving a request to execute the operation.

10. The method of claim 9, wherein the request is received via a network.

11. The method of claim 1, further comprising receiving the data size of the input data, the default input data size, or both the data size of the input data and the default input data size from a requestor of the operation.

12. The method of claim 1, further comprising receiving the data size of the input data, the default input data size, or both the data size of the input data and the default input data size as metadata in a container that also includes the input data.

13. The method of claim 1, further comprising returning a result of the execution of the operation.

14. The method of claim 1, wherein initiating the execution of the operation includes loading the computer program into a software runtime environment that is configured to communicate with the machine learning accelerator hardware.

15. A system, comprising:
   a processor configured to:
      receive a computer program compiled for a machine learning accelerator hardware and associated with a default input data size;
      initiate an execution of an operation of the computer program;
      receive a data size of an input data of the operation;
      identify that the data size of the input data of the operation is smaller than the default input data size; and
      cause the data size of the input data of the operation that is smaller than the default input data size to be transferred to the machine learning accelerator hardware for the input data of the operation, including by being configured to:
         utilize a device manager component configured to manage the machine learning accelerator hardware and provide a direct memory transfer instruction using the data size of the input data of the operation that is smaller than the default input data size;
         utilize a driver component configured to be an interface between the device manager component and the machine learning accelerator hardware to receive the direct memory transfer instruction; and
         utilize the driver component to generate a peripheral component interconnect bus compatible transfer command to transfer the data size of the input data of the operation based on the received direct memory transfer instruction;
   the machine learning accelerator hardware; and
   a memory coupled to the machine learning accelerator hardware.

16. A computer program product, the computer program product being embodied in a non-transitory computer readable storage medium and comprising computer instructions for:
- receiving a computer program compiled for a machine learning accelerator hardware and associated with a default input data size;
- initiating an execution of an operation of the computer program;
- receiving a data size of an input data of the operation;
- identifying that the data size of the input data of the operation is smaller than the default input data size; and
- causing the data size of the input data of the operation that is smaller than the default input data size to be transferred to the machine learning accelerator hardware for the input data of the operation, including by:
  - utilizing a device manager component configured to manage the machine learning accelerator hardware and provide a direct memory transfer instruction using the data size of the input data of the operation that is smaller than the default input data size;
  - receiving the direct memory transfer instruction using a driver component that is configured to be an interface between the device manager component and the machine learning accelerator hardware; and
  - utilizing the driver component to generate a peripheral component interconnect bus compatible transfer command to transfer the data size of the input data of the operation based on the received direct memory transfer instruction.

17. The computer program product of claim 16, wherein the machine learning accelerator hardware includes one or more of the following components: an application-specific integrated circuit, a graphics processing unit, or a field-programmable gate array.

18. The computer program product of claim 16, wherein the operation is a convolution operation.

19. The computer program product of claim 16, wherein the operation is a personalized recommendation system operation.

20. The computer program product of claim 16, wherein the operation is part of a machine learning inference operation.

* * * * *